US012404714B2

(12) United States Patent
Gregoriou

(10) Patent No.: US 12,404,714 B2
(45) Date of Patent: *Sep. 2, 2025

(54) SYSTEM AND METHOD FOR SAFETY MANAGEMENT IN ROLL-UP DOORS

(71) Applicant: Rytec Corporation, Jackson, WI (US)

(72) Inventor: Daniel Gregoriou, Kewaskum, WI (US)

(73) Assignee: Rytec Corporation, Jackson, WI (US)

( * ) Notice: Subject to any disclaimer, the term of this patent is extended or adjusted under 35 U.S.C. 154(b) by 474 days.

This patent is subject to a terminal disclaimer.

(21) Appl. No.: 17/589,540

(22) Filed: Jan. 31, 2022

(65) Prior Publication Data

US 2022/0228420 A1 Jul. 21, 2022

Related U.S. Application Data

(63) Continuation-in-part of application No. 16/847,429, filed on Apr. 13, 2020, now Pat. No. 11,236,540, (Continued)

(51) Int. Cl.

*E05F 15/74* (2015.01)
*E06B 9/68* (2006.01)
*E05F 15/73* (2015.01)

(52) U.S. Cl.

CPC ................ *E05F 15/74* (2015.01); *E06B 9/68* (2013.01); *E05F 2015/765* (2015.01); (Continued)

(58) Field of Classification Search

CPC ..... E05F 15/74; E05F 15/78; E05F 2015/765; E06B 9/68; E06B 2009/6809; (Continued)

(56) References Cited

U.S. PATENT DOCUMENTS

| | | | |
|---|---|---|---|
| 2,900,521 | A | 8/1959 | Eames |
| 3,183,499 | A | 5/1965 | Cowen |

(Continued)

FOREIGN PATENT DOCUMENTS

| | | |
|---|---|---|
| CA | 3 221 289 | 12/2022 |
| CN | 205 594 802 | 9/2016 |

(Continued)

OTHER PUBLICATIONS

FlexiForce "Force LC2 safety light curtains manual, " Aug. 18, 2014, Obtained from <http://www.flexiforce.com/issuu/cms/uploads/files/Downloads/E-Operators/force%20family/EN/10%20forceLC2%20EN.pdf>. (Year: 2014).*

(Continued)

*Primary Examiner* — Johnnie A. Shablack

(74) *Attorney, Agent, or Firm* — Schroeder Intellectual Property Law Group, LLC

(57) ABSTRACT

A safety curtain and system includes multiple light emitters and multiple light receivers to detect traffic approaching a doorway. The safety curtain my include pairs of multiple light emitters and receivers positioned on both sides of a passageway (doorway) so as to detect approaching traffic. The multiple light emitters and light receivers may detect a height of an approaching traffic (e.g., person or vehicle) and initiate warning lights of a possible door closing. The detected approach of traffic may cause the door to be stopped, reversed or slow down. The system may include a computer to monitor the signals from the receivers and may control the motion of the door.

11 Claims, 5 Drawing Sheets

Related U.S. Application Data which is a continuation of application No. 15/264,179, filed on Sep. 13, 2016, now Pat. No. 10,619,397.

(60) Provisional application No. 62/218,328, filed on Sep. 14, 2015.

(52) U.S. Cl.
CPC ..... *E05Y 2400/44* (2013.01); *E05Y 2400/822* (2013.01); *E06B 2009/6836* (2013.01)

(58) Field of Classification Search
CPC ..... E06B 2009/6818; E06B 2009/6827; E06B 2009/6836; E05Y 2400/44; E05Y 2400/822
See application file for complete search history.

(56) References Cited

U.S. PATENT DOCUMENTS

| | | | | |
|---|---|---|---|---|
| 3,670,164 | A | 6/1972 | Hardy et al. | |
| 3,746,863 | A | 7/1973 | Pronovost | |
| 3,805,061 | A | 4/1974 | De Missimy et al. | |
| 4,029,176 | A | 6/1977 | Mills | |
| 4,266,124 | A | 5/1981 | Weber et al. | |
| 4,452,009 | A | 6/1984 | Baumeler et al. | |
| 4,853,531 | A | 8/1989 | Rejc | |
| 4,866,881 | A | 9/1989 | Morrow et al. | |
| 4,894,952 | A | 1/1990 | Trett et al. | |
| 4,914,859 | A | 4/1990 | Gionet et al. | |
| 4,967,083 | A | 10/1990 | Kornbrekke et al. | |
| 5,001,557 | A | 3/1991 | Begle | |
| 5,015,840 | A | 5/1991 | Blau | |
| RE33,668 | E | 8/1991 | Gray | |
| 5,149,921 | A | 9/1992 | Picardo | |
| 5,193,895 | A | 3/1993 | Naruke et al. | |
| 5,225,689 | A | 7/1993 | Buckle et al. | |
| 5,302,942 | A | 4/1994 | Blau | |
| 5,410,149 | A | 4/1995 | Winston, Jr. et al. | |
| 5,428,923 | A | 7/1995 | Waggamon | |
| 5,641,951 | A | 6/1997 | Cai et al. | |
| 5,925,858 | A | 7/1999 | Full et al. | |
| 5,929,580 | A | 7/1999 | Mullet et al. | |
| 5,969,637 | A | 10/1999 | Doppelt et al. | |
| 6,167,991 | B1 | 1/2001 | Full et al. | |
| 6,243,006 | B1 | 6/2001 | Rejc et al. | |
| 6,292,100 | B1 | 9/2001 | Dowling | |
| 6,304,178 | B1 | 10/2001 | Hayashida | |
| 6,354,716 | B1 | 3/2002 | Chen et al. | |
| 6,678,999 | B2 | 1/2004 | Zengguang et al. | |
| 6,737,968 | B1 | 5/2004 | Ergun et al. | |
| 6,756,910 | B2 | 6/2004 | Ohba et al. | |
| 6,782,660 | B2 | 8/2004 | Takada et al. | |
| 6,812,837 | B2 | 11/2004 | Ikeuchi | |
| 6,970,085 | B2 | 11/2005 | Okabe et al. | |
| 7,044,271 | B2 | 5/2006 | De Coi | |
| 7,045,764 | B2 | 5/2006 | Beggs et al. | |
| 7,048,422 | B1 | 5/2006 | Solomon | |
| 7,064,666 | B2 | 6/2006 | Sasaki et al. | |
| 7,071,459 | B2 | 7/2006 | Pustelniak | |
| 7,084,388 | B2 | 8/2006 | Rejc | |
| 7,140,469 | B2 | 11/2006 | Deplazes et al. | |
| 7,154,112 | B2 | 12/2006 | Eubelen | |
| 7,161,319 | B2 | 1/2007 | Ergun et al. | |
| 7,253,890 | B2 | 8/2007 | Miremadi | |
| 7,380,375 | B2 | 6/2008 | Maly | |
| 7,495,556 | B2 | 2/2009 | Eubelen et al. | |
| 7,533,431 | B2 | 5/2009 | Hochstein et al. | |
| 7,762,304 | B2 | 7/2010 | La Marca et al. | |
| 7,771,080 | B2 | 8/2010 | Platt | |
| 7,900,398 | B2 | 3/2011 | Liles, Jr. | |
| 7,940,300 | B2 | 5/2011 | Spinelli | |
| 8,077,034 | B2 | 12/2011 | Borlez et al. | |
| 8,115,162 | B2 | 2/2012 | Shikai et al. | |
| 8,145,351 | B2 | 3/2012 | Schininger et al. | |
| 8,309,904 | B2 | 11/2012 | De Coi et al. | |
| 8,445,833 | B2 | 5/2013 | Klinghofer | |
| 8,547,234 | B2 | 10/2013 | Maly et al. | |
| 8,575,538 | B2 | 11/2013 | De Coi et al. | |
| 8,791,839 | B2 | 7/2014 | Citta et al. | |
| 8,833,524 | B2 | 9/2014 | De Coi et al. | |
| 8,867,045 | B2 | 10/2014 | Piana et al. | |
| 8,875,441 | B2 | 11/2014 | Agam et al. | |
| 8,904,708 | B2 | 12/2014 | Zacchio et al. | |
| 8,988,213 | B2 | 3/2015 | Leutenegger et al. | |
| 9,057,779 | B2 | 6/2015 | Pfiffner | |
| 9,163,446 | B2 | 10/2015 | Houser et al. | |
| 9,292,136 | B2 | 3/2016 | Pratt et al. | |
| 9,341,013 | B2 | 5/2016 | Wata et al. | |
| 9,503,184 | B2 | 11/2016 | Grimm et al. | |
| 9,528,312 | B2 | 12/2016 | Shimazu et al. | |
| 9,671,523 | B2 | 6/2017 | Gelineau et al. | |
| 9,771,225 | B2 | 9/2017 | Stone et al. | |
| 9,797,184 | B2 | 10/2017 | Collins et al. | |
| 9,830,825 | B2 | 11/2017 | Anstett | |
| 9,926,148 | B2 | 3/2018 | Hochstein et al. | |
| 9,970,230 | B2 | 5/2018 | Scholten | |
| 9,978,233 | B2 * | 5/2018 | Kariniemi | G08B 13/183 |
| 10,087,049 | B2 | 10/2018 | Collins et al. | |
| 10,370,888 | B2 | 8/2019 | Harding | |
| 10,494,853 | B2 | 12/2019 | Scheffler | |
| 10,519,705 | B2 | 12/2019 | Van De Wiel | |
| 10,564,314 | B2 * | 2/2020 | Collins | B66B 13/26 |
| 10,605,001 | B2 * | 3/2020 | Bartole | E05F 15/43 |
| 10,619,397 | B2 | 4/2020 | Gregoriou | |
| 10,837,215 | B2 * | 11/2020 | Schmidt | E05F 15/40 |
| 11,236,540 | B2 | 2/2022 | Gregoriou | |
| 11,346,141 | B2 * | 5/2022 | Gregoriou | E06B 9/68 |
| 11,708,722 | B2 * | 7/2023 | Beggs | E06B 9/13 160/270 |
| 11,804,114 | B2 * | 10/2023 | Gregoriou | E06B 9/68 |
| 11,889,605 | B1 * | 1/2024 | Zhu | H05B 47/175 |
| 11,952,825 | B2 * | 4/2024 | Beggs | E06B 9/581 |
| 2005/0103577 | A1 | 5/2005 | Warner | |
| 2006/0022596 | A1 | 2/2006 | Watanabe et al. | |
| 2006/0162254 | A1 | 7/2006 | Imai et al. | |
| 2008/0022596 | A1 | 1/2008 | Boerger et al. | |
| 2010/0037522 | A1 | 2/2010 | Wirth et al. | |
| 2010/0162629 | A1 | 7/2010 | Wirth et al. | |
| 2010/0309007 | A1 | 12/2010 | Goldsmith | |
| 2010/0319256 | A1 | 12/2010 | Agam et al. | |
| 2010/0325959 | A1 * | 12/2010 | De Coi | E05F 15/74 49/28 |
| 2011/0203059 | A1 | 8/2011 | Whitley et al. | |
| 2011/0271602 | A1 * | 11/2011 | Bartole | G01S 17/42 49/506 |
| 2011/0284171 | A1 | 11/2011 | Daniele | |
| 2012/0154583 | A1 | 6/2012 | Lundberg | |
| 2013/0062511 | A1 | 3/2013 | De Coi et al. | |
| 2013/0083330 | A1 | 4/2013 | Piana et al. | |
| 2013/0106601 | A1 * | 5/2013 | Leutenegger | E06B 9/88 340/532 |
| 2013/0259306 | A1 | 10/2013 | Lee | |
| 2015/0315834 | A1 | 11/2015 | Collins et al. | |
| 2016/0040469 | A1 * | 2/2016 | Lietz | E06B 9/82 49/31 |
| 2016/0047159 | A1 | 2/2016 | Scholten | |
| 2016/0284175 | A1 | 9/2016 | Finn et al. | |
| 2016/0298373 | A1 | 10/2016 | Lietz et al. | |
| 2016/0348429 | A1 | 12/2016 | Frede | |
| 2016/0348430 | A1 | 12/2016 | Lorenzani et al. | |
| 2016/0376843 | A1 | 12/2016 | Schneider et al. | |
| 2017/0074039 | A1 | 3/2017 | Gregoriou | |
| 2017/0138111 | A1 | 5/2017 | Lietz et al. | |
| 2017/0223254 | A1 | 8/2017 | Brinkman | |
| 2017/0254141 | A1 | 9/2017 | Iglesias Ballester | |
| 2017/0306696 | A1 | 10/2017 | Slupik et al. | |
| 2017/0314314 | A1 | 11/2017 | Collins et al. | |
| 2017/0315262 | A1 | 11/2017 | Collins et al. | |
| 2018/0002980 | A1 | 1/2018 | Bartole et al. | |
| 2018/0209198 | A1 | 7/2018 | Company | |

(56) References Cited

U.S. PATENT DOCUMENTS

| | | | | |
|---|---|---|---|---|
| 2020/0355014 | A1 | 11/2020 | Gregoriou | |
| 2022/0228420 | A1* | 7/2022 | Gregoriou ............... | E05F 15/74 |
| 2023/0203876 | A1* | 6/2023 | Gregoriou ............... | E05F 15/74<br>160/7 |

FOREIGN PATENT DOCUMENTS

| | | |
|---|---|---|
| CN | 118 148 479 | 6/2024 |
| DE | 10 2010 017 398 | 12/2011 |
| DE | 20 2015 104 582 | 1/2017 |
| DE | 10 2016 119 343 | 4/2018 |
| EP | 0 598 630 | 5/1994 |
| EP | 1 626 924 | 2/2006 |
| EP | 2 256 277 | 12/2010 |
| EP | 2 292 548 | 3/2011 |
| EP | 2 374 985 | 10/2011 |
| JP | 2005-048581 | 2/2005 |
| JP | 2007-138524 | 6/2007 |
| JP | 2017-512268 | 5/2017 |
| KR | 102 649 476 | 3/2024 |
| WO | 2014/147292 | 9/2014 |
| WO | 2015/000622 | 1/2015 |
| WO | 2016/022534 | 2/2016 |
| WO | 2016/029246 | 3/2016 |
| WO | 2019/219791 | 11/2019 |

OTHER PUBLICATIONS

Unpublished U.S. Appl. No. 18/116,398, filed Mar. 2, 2023.

Office Action in related Canadian Patent App. No. 2,998,786 dated Jan. 20, 2023, 8 pages.

* cited by examiner

SYSTEM AND METHOD FOR SAFETY MANAGEMENT IN ROLL-UP DOORS

CROSS-REFERENCE TO RELATED APPLICATIONS

This application is a continuation-in-part of U.S. patent application Ser. No. 16/847,429 filed Apr. 13, 2020, which is a continuation application of U.S. patent application Ser. No. 15/264,179 filed Sep. 13, 2016, which claims benefit and priority to U.S. Provisional Application Ser. No. 62/218,328 filed Sep. 14, 2015—the disclosures of all of which are incorporated herein by reference in their entirety.

BACKGROUND

1.0 Field of the Invention

The present disclosure relates to a system and a method for safety management for doors and, more particularly, a system and a method for safety management in industrial doors which provides improved detection of traffic therethrough, and improved control of the motion of the door, among other features.

2.0 Related Art

Currently, door assemblies and/or window assemblies, such as, for example, for high-performance doors used in commercial applications, or garage doors, are often constructed with sensors to detect motion or cause a state change of the door or window. High-performance overhead doors may be provided with two sets of photo electric single beam sensors (hereinafter referred to as "photo eyes") as a standard feature, perhaps as a separate LED warning light. A "set" of photo eyes may include a single beam emitter and receiver pair. Generally, the sensor may react when the light beam between the emitter and receiver is blocked or broken. One set of photo eyes may be located on each side of a door opening. In some applications, the photo eyes may be installed at the factory and may have a fixed position and distance from the moving portion of the door. Alternatively, one or both of the provided photo eyes may be shipped separately with brackets for field installation.

A "set" of photo eyes that includes a single beam emitter and receiver pair has significant limitations and capabilities. A system that improves on this would be a welcomed addition to safety systems for doors.

SUMMARY OF THE DISCLOSURE

According to one aspect of the invention, a door safety system for an industrial door assembly having a door panel to open and close a doorway, a motor for moving the door panel, and a controller for controlling the motor, is provided. The door safety system includes at least one light curtain having an array of photo eyes formed by at least one light emitting device and at least one light receiving device. The light emitting device includes a plurality of beam emitters, while the at least one light receiving device has a plurality of beam receivers for detecting one or more light beams emitted by the plurality of light emitters. Either or both of the at least one light emitting device and the at least one light receiving device may also include at least one warning light for providing visual warnings related to the status of the door and an associated door panel and/or related to traffic located proximate to the door panel.

The door safety system may be in communication with the controller so that the controller may receive at least one signal from the at least one light curtain, generally from the at least one light receiving device, wherein the at least one signal conveys a status of at least one of the plurality of beams detected by the plurality of beam receivers in the at least one light receiving device. For example, the at least one signal may indicate which, if any, of the plurality of beam receivers have failed to detect an emitted beam of light. The controller may be configured to control movement of the door based on the at least one signal.

In addition to controlling the movement of the door panel based on the at least one signal, the controller may also be configured to determine a height of traffic passing through the at least one light curtain based on the at least one signal. For example, the at least one signal may include an indication of which beam receivers from the plurality of beam receivers failed to detect a beam for any period of monitoring, and based on the position of the beam receivers which did not detect a beam, determine how tall the traffic passing through the at least one curtain was.

In order to better monitor the area surrounding the door panel and help ensure safe movement of the door panel, at least a second light curtain may be provided, the second light curtain having an array of photo eyes formed by at least a second light emitting device and at least a second light receiving device. The at least second light emitting device includes a second plurality of beam emitters, while the second light receiving device includes a second plurality of beam receivers, each second beam receiver being positioned to detect at least one beam emitted by the second plurality of beam emitters. The at least second light curtain may be configured to generate at least a second signal which may be transmitted to the controller based on the detection or lack thereof of light beams from the second plurality of beam emitters by the second plurality of beam receivers, with the controller controlling the status and movement of the door panel based on the second signal.

Where at least two light curtains are utilized, a first light curtain may be positioned on a first side of the doorway, while a second light curtain is positioned on a second side of the doorway, with the door panel being located between the first light curtain and the second light curtain. Positioning the at least two light curtains in this manner, and providing a signal to the controller from each light curtain based on the detection and/or lack thereof of light beams by the beam receivers, forms a protected, monitored safety zone between the first and second light curtains, proximate a path of movement of the door panel.

The controller may further be configured to modify a speed and/or a direction of movement of the door panel based on the at least one signal and/or the at least second signal when a second light curtain is utilized. For example, the controller may be configured to speed up, slow down, start, stop, hold in place, or reverse movement of the door panel based on the at least one signal and/or the at least second signal when a second light curtain is utilized.

The door assembly may also include a warning light system comprising at least one warning light for alerting traffic or users located proximate the door of impending door movement or action. The controller may be configured to control the at least one warning light based on the at least one signal, as well as any second warning light based on a second signal associated with a second light curtain when utilized. The warning light system may be controlled by the controller using one or more of an on/off status, a pattern of illuminated lights, a pattern of color of any illuminated lights, a change in color of any illuminated lights, or flash or blink rate of any illuminated lights. Any warning lights provided in the system may be a single light or an array or plurality of lights, with any pattern potentially being produced across the plurality of warning lights so that plurality of warning lights have different colors, or are activated at different times from each other.

Each warning light provided in the system may be further controlled and configured to modify its state of emission based on the status of the door panel and/or an impending action or movement of the door panel. For example, one or more of the color of light, pattern of light, number of lights illuminated, or speed at which the lights are flashed or blinked may be controlled based on the controller preparing to open or close the door panel, or actually opening or closing the door panel.

Where at least two light curtains are used and each includes at least one warning light, each warning light may be controlled so that an indication or warning is supplied to indicate that some traffic or object has entered the protected or monitored zone. For example, if a person or vehicle enters the monitored area by disrupting beams to one or more beam receivers in the first light detecting device on a first side of the door panel, upon receipt of the at least one signal from the first light curtain, the controller may signal the warning light devices to emit a pattern or color of light to provide an indication that some object or traffic is in the protected zone. Once traffic of a similar height is detected as passing back through either the first or second light curtain, the controller may stop sending the signal to the warning lights to remove the traffic warning.

According to one aspect of the invention, a method for improving industrial door safety is provided. The method includes the steps of providing two light curtains, one on either side of a door panel, with each light curtain having an array of photo eyes each formed by at least one light emitting device and at least one light receiving device. Each light emitting device includes a plurality of beam emitters, while each light receiving device has a plurality of beam receivers configured to detect a presence or a lack of presence of one or more of the plurality of beams from the associated plurality of beam emitters. One or more of the light emitting device or the light receiving device of each light curtain may include at least one warning light for providing visual warning of one or more of the statuses of the door panel, an impending change in status of the door panel, or traffic or objects located proximate the opposing side of the door panel. The method may further include the step of controlling the motion of the door panel and the at least one warning light based on the detected presence or lack of detected presence of the one or more plurality of beams by any of the beam receivers in either of the light receiving devices.

The controlled motion of the door panel may include starting, stopping, slowing, speeding up, or reversing movement of the door panel based on the lack of detection of at least one beam of light by any of the beam receivers in either of the light receiving devices. The step of controlling motion may also be based on a determining the height of an object passing through either light curtain, and whether an object of a similar height has subsequently passed through either light curtain to leave the protected zone. The height of any traffic or objects may be determined by monitoring a number of blocked beams in a vertical plane between one light emitting device and the corresponding light receiving device.

The controlling of the at least one warning light may include changing one or more a color of an activated warning light. Each warning light may comprise a plurality of warning lights, and the plurality of warning lights may be controlled to change color, change a flash or blink rate, or change a pattern or number of lights activated, based on the lack of detection of at least one light beam by any light detection device in either light curtain. The controlling the at least one warning light may indicate that the door panel is about to close or is closing, is about to open or is opening, or if any objects or traffic is located within a monitored area on the opposing side of the door panel. The step of controlling motion of the door may include determining and setting a speed of the door from among multiple possible speeds based on the at least one signal and/or the position of the door panel.

Other advantages and aspects of the present invention will become apparent upon reading the following description of the drawings and detailed description of the invention.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1A:
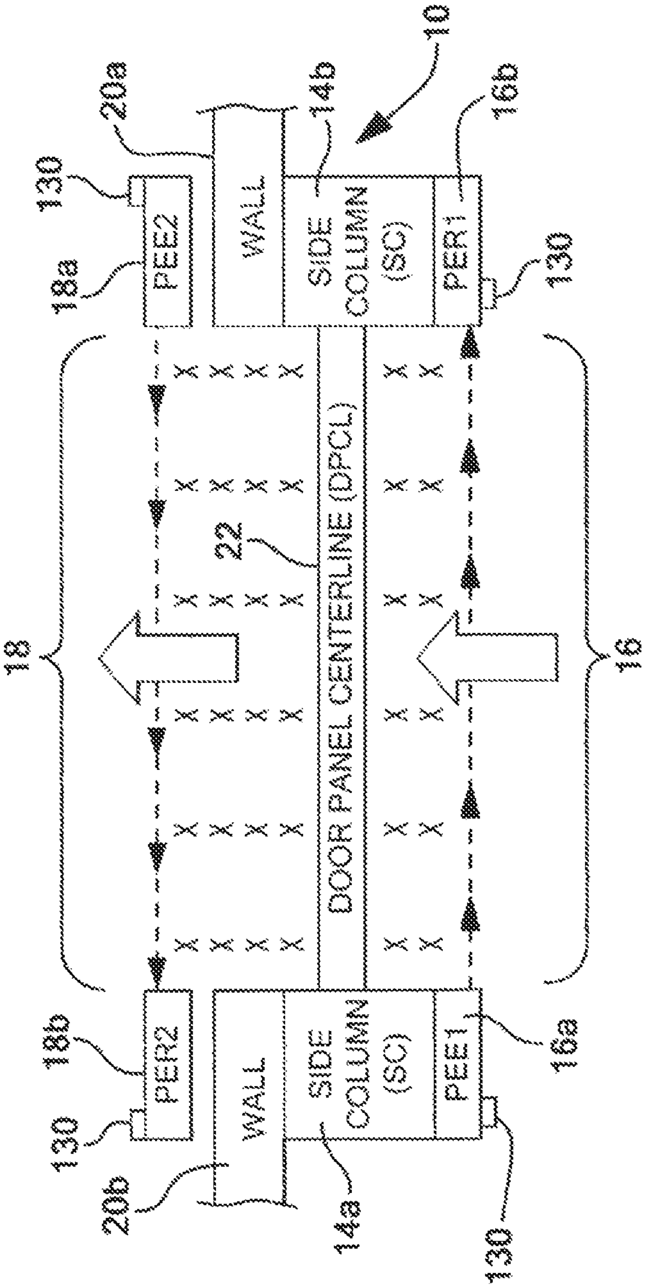
FIG. 1A Prior Art
FIG. 1A is a plan view of an example safety system, configured according to the prior art.

The present disclosure is further described in the detailed description that follows.

DETAILED DESCRIPTION OF THE DISCLOSURE

The disclosure and the various features and advantageous details thereof are explained more fully with reference to the non-limiting examples that are described and/or illustrated in the accompanying drawings and detailed in the following description and attachment. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the examples of the disclosure. The examples used herein are intended merely to facilitate an understanding of ways in which the invention may be practiced and to further enable those of skill in the art to practice the examples of the disclosure. Accordingly, the examples herein should not be construed as limiting the scope of the invention.

The terms "including", "comprising" and variations thereof, as used in this disclosure, mean "including, but not limited to", unless expressly specified otherwise.

The terms “a”, “an”, and “the”, as used in this disclosure, means “one or more”, unless expressly specified otherwise. The term “about” means within plus or minus 10%, unless context indicates otherwise.

Devices that are in communication with each other need not be in continuous communication with each other, unless expressly specified otherwise. In addition, devices that are in communication with each other may communicate directly or indirectly through one or more intermediaries and may be in wired or wireless communication.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1B:
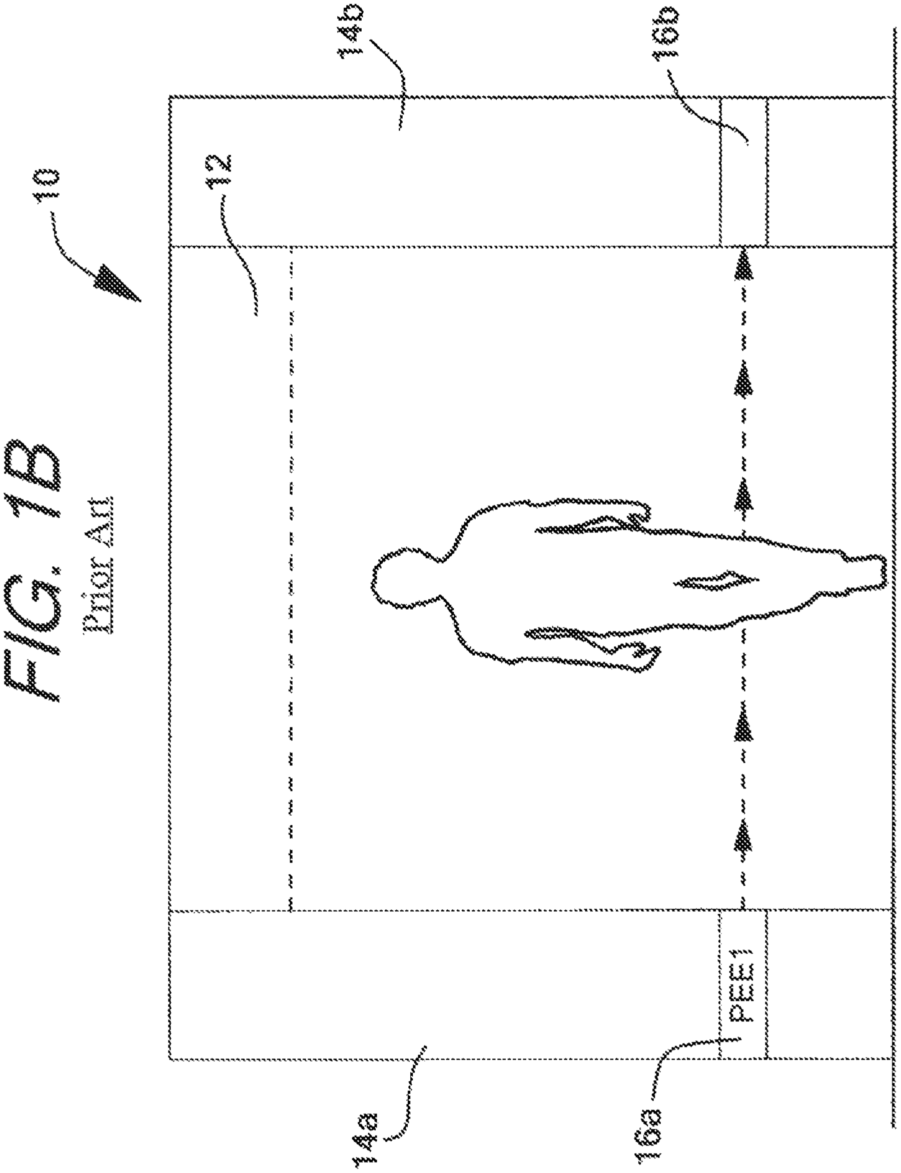
FIG. 1B Prior Art
FIG. 1B is a side view of an example of a typical safety system, configured according to the prior art.

FIG. 1A and FIG. 1B show an overhead type door assembly 10 having a door panel 12 guided in side columns 14*a*, 14*b* and configured with the traditional two sets of photoelectric single beam sensors (“photo eyes”); the first sensor set 16 comprising photoelectric beam emitter 16*a* and photoelectric beam receiver 16*b*; the second sensor set 18 comprising photoelectric beam emitter 18*a* and photoelectric beam receiver 18*b*. Separate LED warning light strips may also be provided to provide status indications related to the door operation. Each “set” of photo eyes consists of a single beam emitter and receiver pair. When operational, one or more of the sensor sets react when the light beam between the emitter and receiver is blocked or broken or otherwise prevented from reaching the receiver, with the door panel being controlled accordingly.

As seen in FIG. 1A, one set of photo eyes is typically located on each side of the door panel and a doorway or opening formed between side columns 14*a*, 14*b*. The structural side columns 14*a*, 14*b* are typically associated with a respective wall section 20*a*, 20*b*. The photo eyes may be installed at the factory and may have a fixed position and distance from door panel 12. Alternatively, one or both of the provided photo eye sets may be provided disengaged from the door assembly and installed during or after installation of the door assembly. At least one pair and as many as two pair of warning lights may be provided. A “pair” of warning lights typically comprises two strips of lights having a plurality of light emitting elements or lamps. The warning lights may be installed in a similar way as the photo eye sets. The position of the warning lights may be selected so that any traffic approaching the doorway may be provided advanced notice that the door panel is about to close or is closing.

Typically, the position of the photo eye beam line (i.e., a photo beam created between an emitter 16*a*, 18*a* and a receiver 16*b*, 18*b*) may be placed in parallel and as near to the door panel 12 (when closed) or a centerline 22 of the doorway, as is practical. The positioning of the photo eyes in this way is intended to minimize the distance of area between the photo eye beams and the door panel to more immediately identify traffic that may be directly in, or moving towards, the downward path of the door panel. In the case of after installed photo eye sets, several factors create unavoidable variation in the location of the beams relative to the distance from the door panel such as a thickness of the wall section 20*a*, 20*b* or construction materials, site obstructions, or the like. These variations can result in photo eye beam placement as much as 18-24" from the centerline 22 and may allow traffic to be in the downward path of the door panel, potentially without detection. In situations such as these, a reversing edge system becomes the primary safety sensing device rather than the photo eye beams. The reversing edge system functions only after the edge sensing strip (not shown) located along the leading (i.e., lower) edge of the door panel comes in contact with the traffic in or passing through the doorway.

Figure 2:
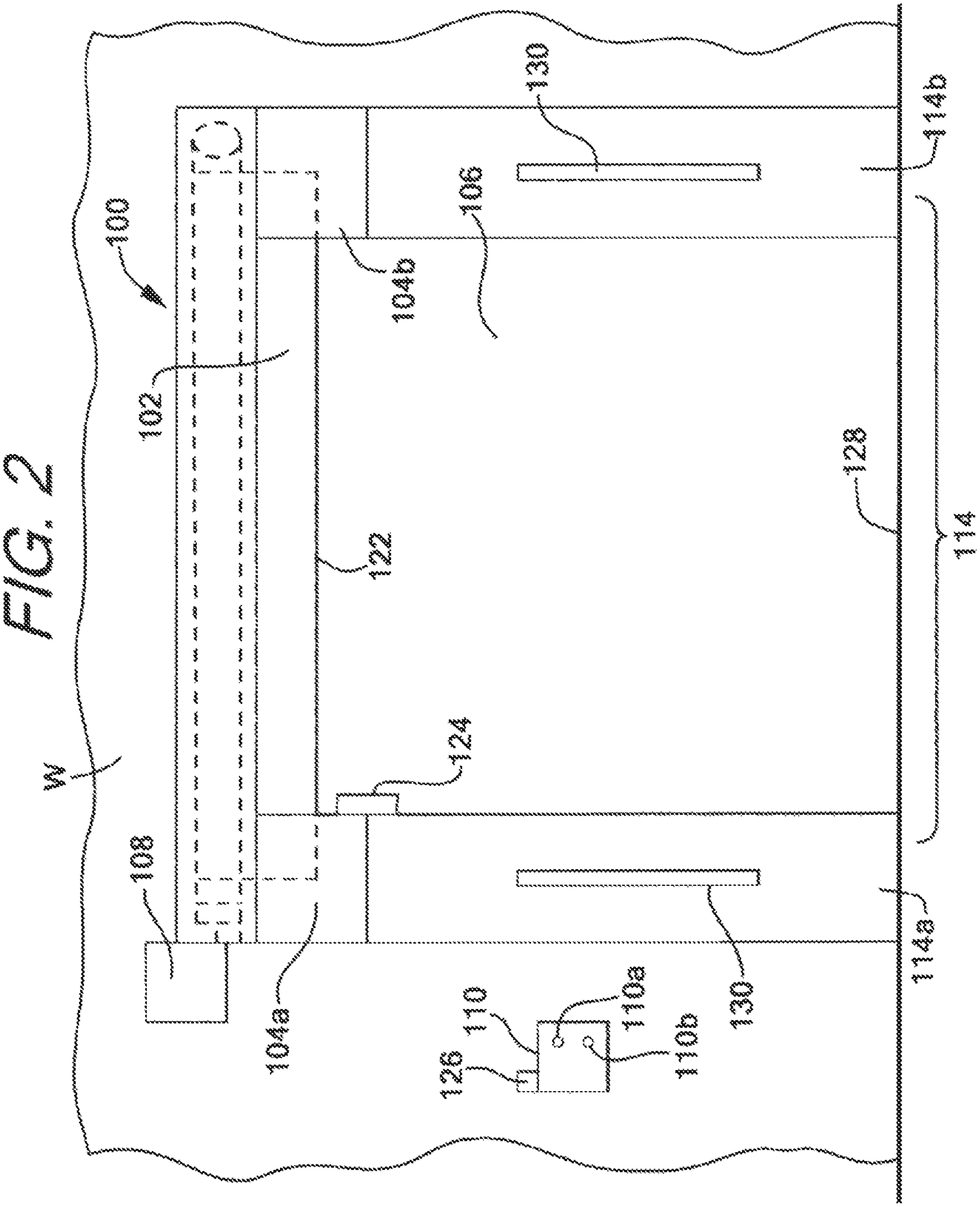
FIG. 2 shows an embodiment of a door assembly according to the present invention.

In order to better explain the benefits of the various novel aspects of the present disclosure, an embodiment of a high-performance, overhead door assembly can be seen in FIG. 2 with a further example found in U.S. Pat. No. 8,887,790. Though principally discussed as being utilized with such a door herein, it should be understood that the safety system and method may be utilized with automatic industrial doors of any type, including but not limited to doors having a sliding or laterally moving door panel, or doors having a non-roll up vertically moving, sliding, or rolling door panel which may include panel doors, slat doors, or the like.

As seen in FIG. 2, a door assembly 100 may include a door panel 102 which is vertically moved within side columns 104*a*, 104*b* (best seen in FIG. 3 which is an overhead view of the door assembly in FIG. 2) in order to open and close a doorway 106 formed in wall W and between the side columns. In order to facilitate movement of the door panel, a motor 108 is provided. In order to control and operate motor 108, door controller 110 is provided which communicates with and controls the motor to start and stop opening and closing sequences.

Motor 108 may be configured to be capable of rotating a drum, directly or indirectly through the use of a second drive drum coupled to the motor which engages and winds and unwinds door panel 102 from a winding drum, in a clockwise or counterclockwise direction. Direct or indirect rotation of the drum in one direction, for example the counterclockwise direction, causes the door panel to wind onto the drum opening the doorway, and direct or indirect rotation of the drum in the opposite direction, for example the clockwise direction, causes the door panel to unwind from the drum closing the doorway. Alternatively, motor 108 may be coupled to door panel 102 in order to raise and lower the door panel through the use of cables and pulleys or tracks which may lift and lower the door panel to open and close the door panel. Motor 108 may also be coupled to a sliding or horizontal moving door panel in order to laterally slide a door panel in two directions to open and close a doorway.

Exemplary controllers which may be used for controller 110 in door assembly 100 include the System 3® and System 4® controllers sold by Rytec Corporation. Door controller 110 may be configured to receive or generate a signal to open or close the door panel, and in response to the receipt of a signal, or the internal generation of a signal, transmit a corresponding signal to motor 108 which activates the motor to begin the appropriate operation. Door controller 110 may be configured to receive a manual input to begin an opening or closing sequence, like for example as a result of a user pushing an activator in the form of a corresponding button 110A or 110B on controller 110, or an infrared or wireless signal from a controller activated by a user. Door controller 110 may also (or alternatively) be configured to begin an opening sequence through the receipt of a signal from an activator in communication with the controller, the activator being in the form of a sensor positioned proximate the door panel that traffic is approaching the door assembly. Such sensors include, but are not limited to, an optical sensor, a proximity sensor, a motion sensor, a pressure sensor, a camera, or any other sensor which detects traffic approaching the door and is capable of generating a signal in response to the detected traffic, and is capable of transmitting the signal to the controller to notify the controller that traffic is approaching the door assembly and that the door panel should be opened.

Door controller 110 may also (or alternatively) be configured to begin a closing sequence based on an internal clock or countdown after door panel 102 has been opened for a set period of time and no further open signal has been received by the controller. For example, when the controller receives a manually activated signal or sensor activated signal to open door panel 102, controller 110 may activate motor 108 to facilitate the raising or sliding of the door panel to open doorway 106. Once door panel 102 is moved to the open position and controller 110 stops motor 108, the controller may begin an internal countdown clock to automatically close the door panel after a set period of time if no further open signals are received. The duration of the countdown clock may be programmed or reprogrammed in the controller by a user. For example, the duration may initially be programmed for the controller to activate the motor 30 seconds after a door panel has been fully opened, and may later be reprogrammed to activate the motor in more or less time, as desired by a user. In order to store and execute all programming discussed herein, controller 110 may include an internal memory to store any parameters set by a user, and a processor to execute any stored actions and transmit any required signals to any elements of the door assembly.

Figure 3:
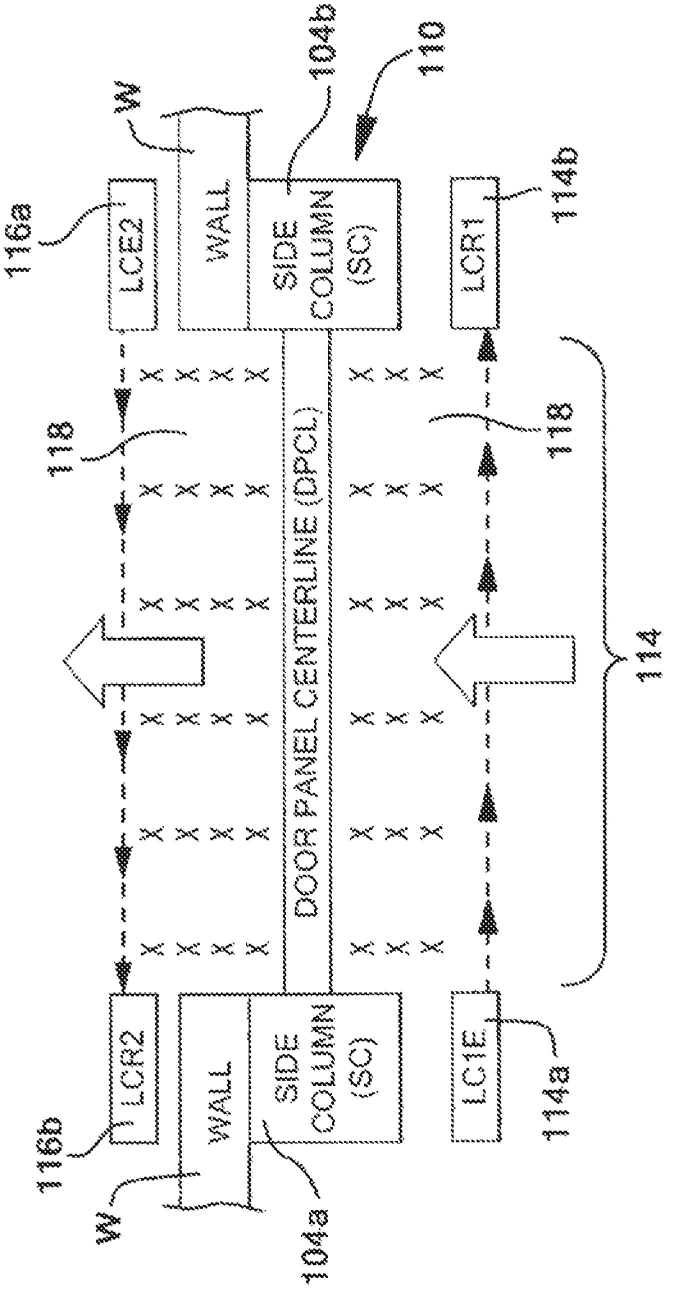
FIG. 3 is a top view of the door assembly of FIG. 2.
Figure 4:
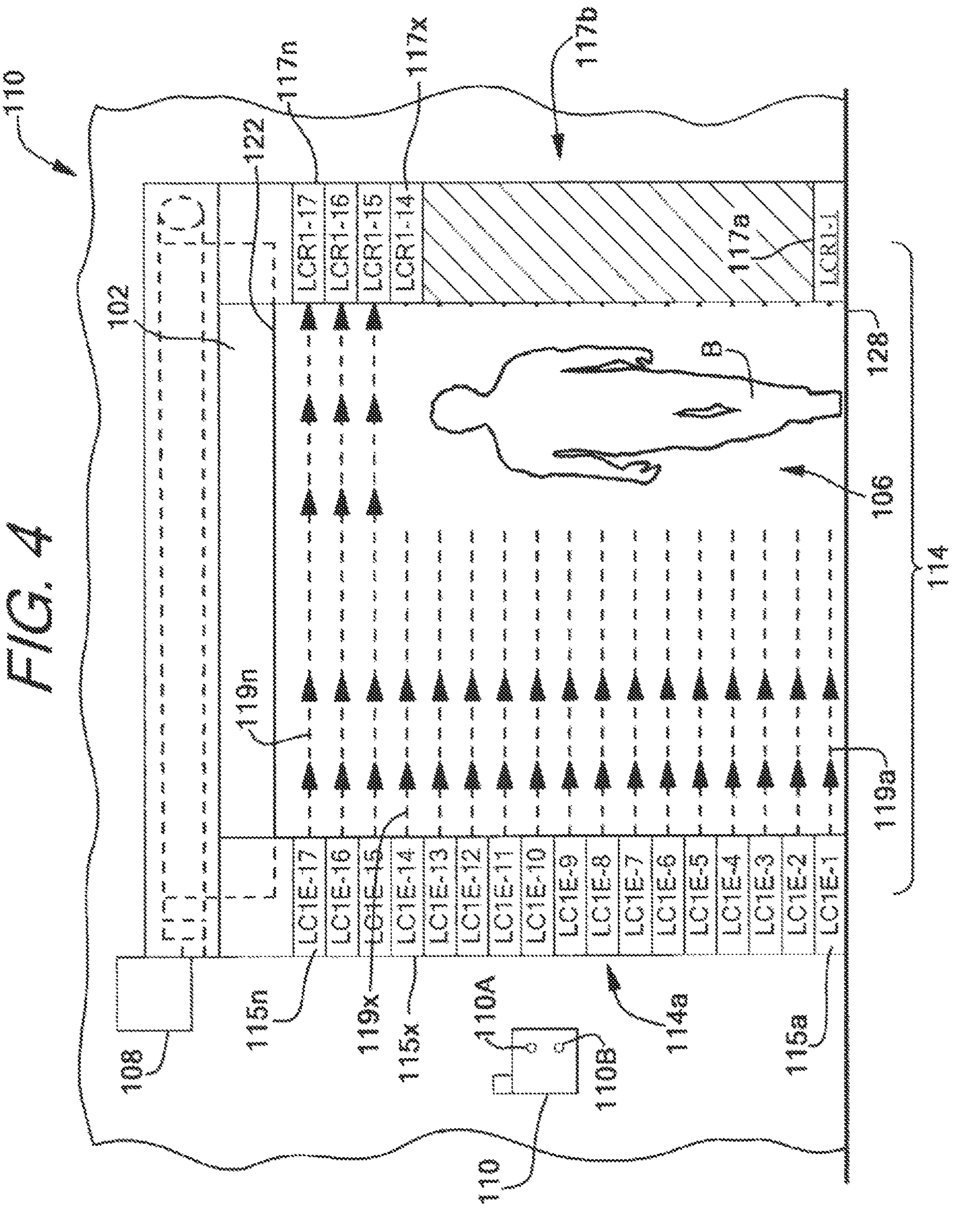
FIG. 4 is a view of the door assembly in FIG. 2 identifying the plurality of beam emitters, beam receivers, and showing the corresponding beams.

As also seen in FIG. 2, door assembly 100 further includes a safety system to help prevent closure of the door on any traffic or objects located proximate the door panel when the door panel is closing. The safety system includes a first light curtain 114 having a having an array of photoelectric sensors ("photo eyes") formed by a first light emitting device 114*a* and a second light receiving device 114*b*. As seen in FIG. 3, a second light curtain 116 having a second array of photo eyes formed by light emitting device 116*a* and a second light receiving device 116*b* may be positioned on the opposing side of door panel 102 and doorway 106. Each light curtain 114, 116 comprises an array of photo eye sets, with each light emitting device having a plurality of beam emitters and each light receiving device having a plurality of beam receivers. Though only beam emitters 115*a*-115*n* and beam receivers 117*a*-117*n* are shown in FIG. 4, for example, it should be understood a corresponding configuration forms light curtain 116 and light emitting device 116*a* and light receiving device 116*b*. A protected zone 118 is formed between light curtain 114 and light curtain 116, in the area of the path of movement of door panel 102 and doorway 106.

Light curtains 114, 116 may be positioned in a manner such that each beam emitted from a beam emitter in light emitting device 114 or 116 extends substantially parallel to door panel 102, with slight variation potentially required due to site requirements, for example. Each light curtain 114, 116 may be positioned adjacent doorway 106, for example coupled to side columns 104*a*, 104*b* on one side of the door panel, or wall W on the opposing side of the door panel. Light curtains 114, 116 may be moved outwards from the side column and/or wall, so long as the beams emitted by the light emitters remain substantially parallel to the door panel and doorway. By moving the light receivers outwards from the doorway, a larger protected zone surrounding the door panel may be formed.

As seen in FIG. 4, which is a view of the door assembly of FIG. 2 with beam emitters 115*a*-115*n* and beam receivers 117*a*-117*n* in the first light curtain 114 identified, along with the corresponding light beams 119*a*-119*n* between the emitters and receivers shown. It should be understood that light curtain 116 is configured in substantially the same manner, having a plurality of beam emitters and beam emitters arranged in a substantially similar manner as light curtain 114. Light curtains 114, 116 may each transmit at least one signal to controller 110 regarding the status of each light beam. The at least one signal may be a signal that a beam receiver or multiple beam receivers in the respective light curtain have failed to detect the corresponding beam. Light curtains 114, 116 may also be configured to provide an "all clear" signal to the controller when all beam receivers are presently receiving the corresponding light beam. The "all clear" signal may be continuously transmitted to the controller, or may be sent periodically to the controller so that the controller can monitor the status of each emitter and receiver in each light curtain to prevent a failure of the safety system. In the case of a continuous "all clear" signal, a signal that one or more beam receivers are not receiving the corresponding beam may be dispensed with, as the "all clear" signal related to any blocked beam receivers will no longer be provided by the light curtain. Each individual beam receiver may send a signal to a processer within the light curtain and/or light receiving device which passes a single signal along to the controller to notify the controller that some beam receivers are not receiving a beam, or alternatively each individual beam receiver may transmit a signal directly to the controller so that each light curtain sends a plurality of signals to the controller, one for each beam receiver.

Each beam emitter 115*a*-115*n* and beam receiver 117*a*-117*n* pair may be placed at a known position in the photo eye array, arranged vertically along the door opening so that the controller can identify the height at which a particular beam or beams are blocked. Each emitter and receiver pair in each light curtain may be uniformly spaced, with an emitter and receiver pair every six inches or twelve inches vertically, for example, along the entirety of the height of the doorway. Alternatively, emitter and receiver pairs may be spaced differently at different heights along the doorway. For example, emitter and receiver pairs may be positioned every six inches vertically over the first eight feet of the doorway, and every 12 inches vertically there above. Diversified spacing may be particularly beneficial in larger doors which are 15 feet or higher. Positioning the beam emitter and receiver pairs vertically closer together near the bottom of the opening helps better detect pedestrian traffic, which will help prevent the door from closing on pedestrian traffic and help ensure that all traffic have left the area before the door panel is closed.

As seen in in FIG. 4, as traffic, embodied as body B, passes through light curtain 114, light receivers 117*a*-117*x* not receiving a corresponding beam, beam 119*a* for example, will transmit a signal to within the light curtain or directly to controller 110 that the beam receiver is not receiving its corresponding beam, and that therefore the corresponding light beam is presumed to be blocked by traffic or some other object entering the protected zone. In response to receipt of signals from light curtain 114 and/or light receivers 117*a*-117*x* that the corresponding beams are blocked, controller 110 may calculate the height of the traffic which passed through the light curtain and blocked the light beams based on the position of each beam receiver in the light receiving device 114*b*. After calculating the height, controller 110 may not activate motor 108 and hold door panel 102 open until traffic of a similar height leaves the protected zone and passes through one of the two light curtains.

The controller may also be optionally programmed to close the door panel after an extended period of time if traffic is detected as entering the protected zone through a light curtain but lingers and does not exit the protected zone. For example, if a controller is programmed to close the door panel 30 seconds after opening during normal operation, if traffic B in FIG. 4 enters the protected zone through one light curtain, rather than the controller holding the door open until traffic having the same height as B is detected exiting the protected zone, the controller may optionally be programmed to close at the end of the 30 second countdown or after some preset extended period of time. An audible warning speaker 124 may be fixed within assembly 100 and placed in communication with controller 110 so that an audible warning may be provided to lingering traffic in the protected zone prior to the controller activating or reactivating the motor to close the door panel.

If door panel 102 has already begun closing when traffic enters protected zone 118 through either light curtain 114, 116, controller 110 may be programmed to execute a plurality of options in response to signal(s) being received from the light curtain(s) and/or beam receivers. As a default setting, the controller may be programmed to stop and reverse the motor to immediately open the door panel to a fully open position if any signal is received from either light receiving device that one or more beams are blocked, regardless of the height of the traffic and position of the door panel when the signal is received.

Rather than reverse and fully open door panel 102, controller 110 may be programmed to take one or more alternative actions based on the position of door panel 102 and the detected or measured height of any traffic. For example, if traffic interrupts beams from reaching beam receivers known to be up to six feet in height enters protected zone 118 through light curtain 114 or 116, and controller 110 determines that bottom edge 122 of door panel 102 is located some amount greater than six feet above lower boundary 128 of doorway 106 based on the stored distance between the bottom edge of the door panel and the lower boundary when the door panel is fully open, the current closing speed of the door panel, and duration of time since motor 108 was activated to close door panel 102, controller 110 may optionally stop door panel 102 in place, or slow the motor to reduce the closing speed of the door panel to allow the traffic to pass while the door panel continues to close. After slowing the closing speed of the door panel, if similar height traffic is not detected passing out of the protected zone through either light curtain, the controller may be optionally programmed to stop the movement of the door panel so that the lower edge of the door panel stops at a greater height above the lower boundary of the doorway than the height of the detected, lingering traffic.

In order to help determine the speed at which controller 110 slows door panel 102 to and/or whether the door panel should be stopped when traffic is detected while closing, a speed sensor 126 may be utilized to determine the speed of the oncoming traffic. Elements such as one or more speed detecting radar guns may be incorporated into the system and coupled to the controller so that the speed of objects when they reach either light curtain is measured and known so that the controller can make a more informed adjustment to the closing sequence if options in addition to an automatic complete reversal of the door panel are programmed in the controller.

Regardless of whether or not any speed sensor is utilized, the controller may also be programmed to slow the closing speed in response to traffic which is detected as entering the protected zone through a light curtain but does not exit prior to controller 110 receiving an external signal or generating an internal signal to close door panel 102. Rather than initiating a normal closing sequence after an extended period of time, or simply holding the door panel open, the controller may optionally be programmed to begin closing the door panel at a regular or a slower speed within any normal, programmed time period after traffic is detected as entering but not leaving the protected zone. The controller may further be optionally set to hold the door panel open at a height where the open portion of the doorway maintains a greater height than the height of any traffic which has been detected entering but not exiting the protected area. This height may be held until the traffic leaves the area, or for some other preprogrammed amount of time before the controller begins the closing sequence for the door panel again. If the controller is programmed to restart the closing sequence after pausing during the initial closing sequence, the controller may start the second closing sequence at the same, faster, or slower speed than the initial closing sequence depending on the status of the traffic detected entering the protected area.

Controller 110 may also optionally be programmed to partially reverse a partially closed or closing door panel 102 in response to traffic being detected while. For example, if traffic having a height of six feet is detected as entering the protected area through light curtain 114 or 116, and the controller determines that the height of the opening under bottom edge 122 of door panel 102 is currently five feet above lower boundary 128 of doorway 106, controller 110 may be optionally programmed to stop the movement of the door panel and reverse the door panel so that the opening is enlarged to a height greater than the height of the detected traffic until traffic having the same height is detected passing through either light curtain.

In order to help prevent traffic from entering the protected zone immediately prior to a door closing sequence, as seen in FIGS. 2 and 3, one or more light emitting devices 114*a*, 116*a* and/or one or more light receiving devices 114*b*, 116*b* and/or side columns 104*a*, 104*b* may include an integrated warning system having at least one warning light device 130 which may be coupled to controller 110 and utilized to provide indications of impending status changes or movement of door panel 102. Each warning light device 130 utilized in the door assembly may have one or more lighting elements or lamps, which may emit light in one or multiple colors. The lighting elements or lamps may be incandescent lights, light emitting diodes, or any other element capable of quickly turning on and off and blinking when necessary. When a plurality of lighting elements or lamps are utilized, they may be arranged in any manner, for example as strips of lights or bunches or circles of lights with various lighting elements or lamps stacked to resemble traffic lights.

In conjunction with controlling motor 108 to open and close door panel 102, controller 110 may also be in communication with and configured to activate any warning light devices 130. Controller 110 may be programmed to send a signal to any warning light device 130 at some preset amount of time prior to motor 108 being activated to close door panel 102 and while motor 108 is activated and door panel 102 is closing. Controller 110 may also be programmed to send a signal to any warning light device 130 for some preset amount of prior to motor 108 being activated to open door panel 102 and/or while motor 108 is activated and door panel 102 is opening. Finally, controller 110 may also be programed to transmit a signal to any warning light device 130 when a fault is detected anywhere in door assembly 100, or if door assembly 100 is inoperable for any reason.

Each signal controller 110 is programmed to transmit to any warning light device 130 may cause each warning light device to illuminate in a different color or pattern. For example, if controller 110 is programmed to transmit a signal to any warning light device 130 at some preset time before motor 108 is activated and door panel 102 is closed, the signal from the controller may cause any warning light device to emit a blinking light or a solid light. As the timer within controller 110 counts down to closing, if no signal is received from either light curtain 114, 116 that traffic has entered protected area 118 and no further open signal has been received from any activator, controller 110 may alter the signal so that the state of the warning light devices changes, causing any light emitters to blink faster, or change color, to indicate a more imminent status change and movement of the door panel. If controller 110 is programmed to transmit a signal to any warning light device 130 once the controller activates motor 108 and begins to close door panel 102, the signal transmitted by the controller may change the blinking light to a solid light, or change a solid light color to a different color to indicate a change in operation and movement of the door panel.

Similarly, when controller 110 receives a signal to activate motor 108 to open door panel 102, a signal may be transmitted to any warning light device 130 for a brief period of time prior to the motor being activated and the door panel opening. Such a signal may cause any warning light device 130 to blink, or be a solid color indicating a change in status is approaching. Once motor 108 is activated and door panel 102 begins opening, controller 110 may transmit a signal to warning light devices 130 to make any blinking light solid, or change the color of any solid light to indicate a change in operation and movement of the door panel.

Controller 110 may also be configured to transmit a signal to activate warning light devices 130 any time traffic enters protected zone 118 through either light curtain 114, 116, regardless of the position of door panel 102. When programmed to do so, controller 110 may send a signal to warning light devices 130 to emit a blinking light after some traffic or object has been determined to have entered the protected zone, with the signal continuing until traffic of a corresponding height has been detected passing through either light curtain 114, 116.

Controller 110 may also be programmed to supply a signal to warning light devices 130 if a fault in the door assembly is detected. For example, if door panel 102 becomes disengaged from either side column 104*a*, 104*b*, or a fault with motor 108 is detected preventing activation of the motor, or any other events which would prevent door panel 102 from being opened or closed are detected, or if any of the light curtains 114, 116 or light receiving devices 114*b*, 116*b* are determined by the controller to be faulty, a signal may be transmitted from the controller to the warning light devices to emit a solid or blinking light to notify of the fault.

When programmed for any of these options, the following would be an exemplary mode of activation of the warning light devices by the controller during operation of the door panel:

- Controller receives signal to open a closed door panel, controller signals any warning light devices to blink green light for two seconds prior to opening;
- Controller activates motor to open a closed door panel, controller signals any warning light devices to change to solid green light;
- Once door panel is opened, controller stops transmitting the signal to cause solid green light and begins and internal countdown to automatically close the door panel;
- Internal countdown in controller reaches some preset time prior to activating the motor to close an opened door panel, controller signals any warning light device to blink red light. As the countdown moves below five seconds, the controller may signal the blinking speed to increase;
- Controller activates motor to close an opened door panel, controller signals warning light devices to change to solid red light;
- Once the door panel is closed, controller stops transmitting a signal to the warning light devices to emit solid red light;
- If either light curtain detects traffic or objects entering the protected area at any time, controller signals warning light devices to emit blinking yellow light, regardless of the state of the door panel;
- If any fault is detected which would prevent the door panel from opening or closing, the controller signals any warning light device to emit a blinking orange light; and/or
- If any fault is detected with either light curtain or any of the light emitters or light receivers therein, the controller signals any warning light device to emit a solid orange light.

Any of the programmable options discussed herein may be set within controller 110 during installation and are modifiable at any time thereafter. In a most basic set up, controller 110 may be programmed to monitor each light curtain 114, 116 and hold the door panel open if either light curtain detects traffic entering protected area or zone 108 until traffic of a matching height passes through either light curtain. If motor 108 is already activated and door panel 102 is already closing, in a most basic set up controller 110 may stop and reverse the motor to move the door panel to a fully open position. In the most basic set up, controller 110 may also be configured to transmit a signal to any warning light device 130 in the system for some preset time period prior to activating the motor to close door panel 102, and a second signal once the motor is activated and the door panel begins closing to change the state of the warning light device. Additional parameters may be set within controller 110 during set up or any time thereafter relative to opening and/or closing speed of door panel 102, changing any automatic close or open countdown times, transmitting a signal to any warning light device 130 relative to the door panel about to open or opening, and/or signaling for fault. Additionally, controller 110 may be programmed or reprogrammed to set or change responses to either light curtain 114, 116 detecting traffic or objects entering protected zone 118 before or after motor 108 is activated to move door panel 102 in any direction. Where speed sensors are used, the response by the controller to the speed of any detected traffic may be changed.

In operation, the door assembly of the present invention may be programed to act as follows. Though various signals and alerts will be discussed with respect to the door panel, it should be understood that the controller may be programmed to eliminate, add, or modify any monitoring, warning, or control action discussed herein.

Starting with door panel 102 in a closed position, controller 110 may receive a signal from an activator to activate motor 108 to facilitate the raising of door panel 102 and open doorway 106. Upon receipt of the signal to activate motor 108 and open door panel 102, controller 110 may transmit a signal to any warning light devices 130 in the assembly to provide a brief warning that the door panel is about to open. This warning may be very short in duration, for example from one to five seconds, and may activate any light emitters within the warning light devices to emit a blinking light. The purpose of the warning prior to opening may be two-fold. First, it notifies any traffic or individuals around the door assembly that the door panel is about to opened. As these door panels can be very large and moved to the open position very fast, any visual warning to individuals located proximate the door assembly will allow them to prepare for any noise, for example, resulting from the opening of the door panel. Second, such a warning also provides notice to individuals located around the door assembly that some traffic is approaching the door panel requiring that the door panel open, even if it has not reached protected zone 118.

Once any preset duration for warning of the impending movement of the door panel has passed, controller 110 may activate motor 108 to facilitate the raising of door panel 102 to open doorway 106. In conjunction with activating motor 108, controller 110 may transmit a second signal to warning light devices 130 to indicate that the door panel is being opened, the second signal causing the blinking light prior to the door panel opening to become a solid, continuous light. Providing a signal indicating that the door panel is being opened may help eliminate confusion for any traffic approaching the door panel, as well as any individuals located proximate the door assembly, that the door panel is opening, and that passage through the doorway is safe to traverse. Once the door panel is fully opened, the second signal may be stopped by the controller.

Once the traffic which caused door panel 102 to open reaches light curtain 114 or 116, a signal or signals will be sent from the light curtain to controller 110 indicating which beam receivers are no longer receiving their corresponding beam. Based on the vertical positions of the beam receivers within the photo eye array, controller 110 may calculate the approximate height of the traffic passing through the light curtain and into the protected zone.

Immediately upon receipt of the signal from light curtain 114 that some traffic is passing through the curtain, controller 110 may be programmed to send a third signal to the warning light devices 130 which causes the light emitters within each warning light device to blink light of a second color to provide notice that some traffic or object has entered the protected zone. Such warnings will provide notice to all other traffic approaching the door assembly, as well as other individuals in the area which may not be able to see the traffic passing into the protected zone, that some other traffic is in the protected zone and to proceed approaching or moving proximate the door assembly with caution.

Once the traffic in protected zone 118 passes back through light curtain 114, 116 or proceeds through the doorway 106 and the opposing light curtain, a signal or signals will be sent from the appropriate light curtain indicating which beam receivers stopped receiving a corresponding beam. If, based on this signal or signals, the controller determines that the height of the traffic passing through either light curtain matches the height of the previously detected traffic which entered the protected zone, the third signal from the controller to light emitting devices 130 may be stopped, and the normal closing procedure can continue. If the traffic is determined to be a different height than that which was already detected as entering the protected zone, controller 110 will continue the third signal and continue monitoring the light curtains until traffic having similar heights to all traffic detected entering the protected zone has been detected passing out of the protected zone through either light curtain. Until traffic having a height which matches the height of all traffic which has entered the protected zone has been detected a second time, controller 110 may stop any countdown or other closing sequence, and not activate motor 108 so that door panel 102 is held open.

After opening the door panel and/or traffic has cleared the protected zone, controller 110 may begin an internal countdown clock set by a user to countdown some preset amount of time before activating motor 108 to close door panel 102. If the countdown clock is set by the user at 30 seconds, for example, at some preset time before the expiration of the 30 seconds controller 110 may transmit a fourth signal to warning light devices 130 to begin emitting blinking light in a third color to indicate that door panel 102 is about to be closed. The fourth signal may be transmitted at, for example, 10 seconds left in the countdown clock to provide notice to traffic approaching the door panel, as well as other individuals around the door assembly, that door panel 102 is about to be closed. If a further activation signal is received by the controller to open the door panel from an activator, or some other traffic enters the protected zone through either light curtain, controller 110 may stop and reset the countdown timer, or pause and wait for the traffic to clear the protected zone before restarting the countdown timer.

If the countdown time in the controller reaches zero, controller 110 may transmit a fifth signal to warning light devices 130 to cease blinking and instead emit solid, continuous light, in the third color. At the same time as sending the fifth signal to the warning light devices, controller 110 may also send a signal to motor 108 to activate and facilitate the lowering of door panel 102 to close doorway 106. If no open signal is received from any activator during the closing sequence, and no traffic is detected as entering the protected zone through either light curtain during the closing sequence, door panel 102 will be closed completely and doorway 106 blocked.

If, during the closing sequence, an activator signal is received by controller 110 to open the door panel, controller 110 may stop motor 108, and signal motor 108 to reverse, facilitating the raising of any unwound portion of door panel 102, reopening the doorway fully for approaching traffic to pass through.

If, rather than receiving an activator signal, controller 110 receives a signal from either light curtain 114 or light curtain 116 that some traffic has passed through the light curtain into the protected zone, controller 110 may be programmed to take multiple actions. In a most basic setting, controller 110 may be programmed to stop motor 108, and signal motor 108 to reverse, facilitating the raising of door panel 102 to reopen doorway 106 fully until traffic of a similar size is detected leaving the protected zone through either light curtain 114 or light curtain 116, at which time the countdown clock may begin.

Rather than programming controller 110 to fully reopen door panel 102, controller 110 may instead be programmed to determine the height of the traffic entering the protected zone 118 through light curtain 114 or light curtain 116 and compare this height to the position of bottom edge 122 of door panel 102 which is known to the controller based on the set distance between the lower edge of the door panel and lower boundary 128 of doorway 106, the closing speed of the door panel, and the time since the controller activated motor 108 to facilitate unwinding of the door panel. If the bottom edge of the door panel is determined to be higher than the height of the detected traffic, controller 110 may be programmed to simply stop or slow motor 108 so that the traffic can safely pass under the door panel, before controller 110 reactivates motor 108 once it has been determined traffic of the same height has passed through light curtain 114 or light curtain 116 and exited protected zone 118.

If controller 110 determines that bottom edge 122 is closer to lower boundary 128 of the doorway than the height of the traffic, controller 110 may be programmed to stop motor 108, reverse motor 108 to facilitate raising door panel 102. The amount which controller 110 signals motor 108 to facilitate the raising of door panel 102 may be set to only raise bottom edge 122 of door panel 102 relative to lower boundary 128 to a height higher than the height of the detected traffic. Once it has been determined traffic of the same height has passed through light curtain 114 or light curtain 116 and exited protected zone 118, controller 110 may reactivate motor 108 to facilitate the lowering of door panel 102 to close doorway 106.

A similar method and system may be applied to existing doors equipped with only single beam photo eyes as shown in FIGS. 1A and 1B. With significantly less analytical information available through these single beam devices, the resulting outcome may likely be more frequent "slow closing" movements, but still an improvement in defining the protected zone. Again, the variations in the distance between the field installed photo eyes and the downward moving part of the door may become a non-issue. With backwards compatibility through software upgrade, existing controller controlled doors may benefit from the full or limited design concept with relative ease.

While the invention has been described in terms of examples, those skilled in the art will recognize that the invention can be practiced with modifications in the spirit and scope of the appended claims. These examples are merely illustrative and are not meant to be an exhaustive list of all possible designs, embodiments, applications or modifications of the invention.

What is claimed:

1. An overhead door assembly comprising:

a door panel;

a motor for facilitating the raising and lowering of the door panel;

a controller to control activation of the motor;

a first light curtain in communication with the controller, the first light curtain comprising a first array of photo eye sets having a first plurality of light emitters and a first plurality of light receivers, the first array of photo eye sets extending vertically along the doorway and being positioned such that a beam emitted and received by each photo eye set in the first array of photo eye sets extends parallel to the door panel when the door panel is in a closed position, wherein each photo eye set in the first array of photo eye sets is set at a known vertical height along the doorway, and the controller is configured to determine a size of traffic passing through the first light curtain based;

a second light curtain in communication with the controller, the second light curtain comprising a second array of photo eye sets having a second plurality of light emitters and a second plurality of light receivers, the second array of photo eye sets extending vertically along the doorway and being positioned such that a beam emitted and received by each photo eye set in the second array of photo eye sensors extends parallel to the door panel when the door panel is in a closed position, wherein each photo eye set in the second array of photo eye sets is set at a known vertical height along the doorway, and the controller is configured to determine a size of traffic passing through the second light curtain;

wherein a protected zone monitored by the controller is formed around the door panel between the first light curtain and the second light curtain.

2. The overhead door assembly of claim 1, wherein the known height of each photo eye set in the first array of photo eye sets is set at a same height as the known height of one photo eye set from the second array of photo eye sets.

3. The overhead door assembly of claim 1 further comprising a warning light device, the warning light device comprising a plurality of light emitting elements and being in communication with the controller, the controller providing warning signal to the warning light device in conjunction with activating the motor to close the door panel.

4. The overhead door assembly of claim 3 further comprising at least a second warning light device, the second warning light device comprising a second plurality of light emitting elements and being in communication with the controller, the controller providing the warning signal to the second warning light device in conjunction with activating the motor to close the door panel.

5. The overhead door assembly of claim 4, wherein the warning light device is coupled to the first light curtain and the second warning light device is coupled to the second light curtain.

6. The overhead door assembly of claim 5, wherein each of the plurality light emitting elements of the warning light device and the second plurality of light emitting elements of the second warning light device are configured to emit at least two colors of light.

7. The overhead door assembly of claim 6, wherein the first light curtain transmits at least one first signal to the controller and the second light curtain transmits at least one second signal to the controller, wherein the first signal and the second signal indicate a status of the light beams received by each light receiver in the light curtain.

8. The overhead door assembly of claim 7, wherein the controller transmits the warning signal to the first warning light device and the second warning light device in response to receipt of the first signal from the first light curtain or the second signal from the second light curtain.

9. The overhead door assembly of claim 1, wherein the first light curtain transmits at least one first signal to the controller and the second light curtain transmits at least one second signal to the controller, wherein the first signal and the second signal indicate a status of the light beams received by each light receiver in the light curtain.

10. The overhead door assembly of claim 9, wherein the controller is configured to modify a state of the door panel based on receipt of the first signal or the second signal.

11. The door safety system of claim 10, wherein the controller is configured to change the state of the door panel by activating or stopping the motor to slow down, stop, reverse, or start movement of the door based on receipt of the first signal or the second signal.

* * * * *